United States Patent [19]

Kamps et al.

[11] Patent Number: 6,070,999
[45] Date of Patent: Jun. 6, 2000

[54] HEADLIGHT ANTIGLARE DEVICE

[76] Inventors: John Herbert Kamps, 7751 Pinehurst SW., Grand Rapids, Mich. 49548; Sherwin W. Kamps, 1328 Greenly, Hudsonville, Mich. 49426

[21] Appl. No.: 09/365,478

[22] Filed: Aug. 2, 1999

[51] Int. Cl.[7] .................................................. F21W 101/10
[52] U.S. Cl. ..................... 362/523; 362/528; 362/529; 362/512
[58] Field of Search .................... 362/511, 512, 362/507, 523, 528, 529, 546

[56] References Cited

U.S. PATENT DOCUMENTS

| | | | |
|---|---|---|---|
| 615,490 | 12/1898 | Metternich | 362/512 X |
| 1,328,692 | 1/1920 | Richard | 362/507 |
| 1,388,567 | 8/1921 | Hoffman | 362/523 X |
| 1,471,842 | 10/1923 | Gage . | |
| 1,489,139 | 4/1924 | Mike . | |
| 1,540,476 | 6/1925 | Hoffman et al. . | |
| 1,563,656 | 12/1925 | Radloff | 362/546 X |
| 1,949,769 | 3/1934 | Walch . | |
| 1,965,801 | 7/1934 | Gandillon | 362/523 X |
| 1,965,869 | 7/1934 | Walch . | |
| 2,323,978 | 7/1943 | Davis . | |
| 2,719,216 | 9/1955 | Brewer . | |
| 2,784,303 | 3/1957 | Heiser . | |
| 2,831,960 | 4/1958 | Heiser . | |
| 3,643,081 | 2/1972 | Szeles | 362/523 X |
| 3,876,285 | 4/1975 | Schwarzmuller | 350/152 |
| 4,761,717 | 8/1988 | McMahan et al. | 362/66 |
| 4,802,067 | 1/1989 | Ryder et al. | 362/61 |
| 4,945,453 | 7/1990 | Serizawa et al. | 362/61 |
| 5,060,127 | 10/1991 | Birt | 362/421 |

*Primary Examiner*—Laura K. Tso
*Attorney, Agent, or Firm*—H. Dennis Kelly; Jeffrey T. Hubbard; Timmons & Kelly

[57] ABSTRACT

An elongated duct having a front opening and a rear opening is attached by duct mounting hardware inside the engine compartment of a vehicle. Headlamp mounting hardware attaches a headlamp to the rear opening of the duct, the headlamp being aimed to shine through the duct and out the front opening. The duct mounting hardware maintains the duct at a critical angle of inclination, so that the upper edge of the front opening is level with or below the lower edge of the rear opening.

7 Claims, 2 Drawing Sheets

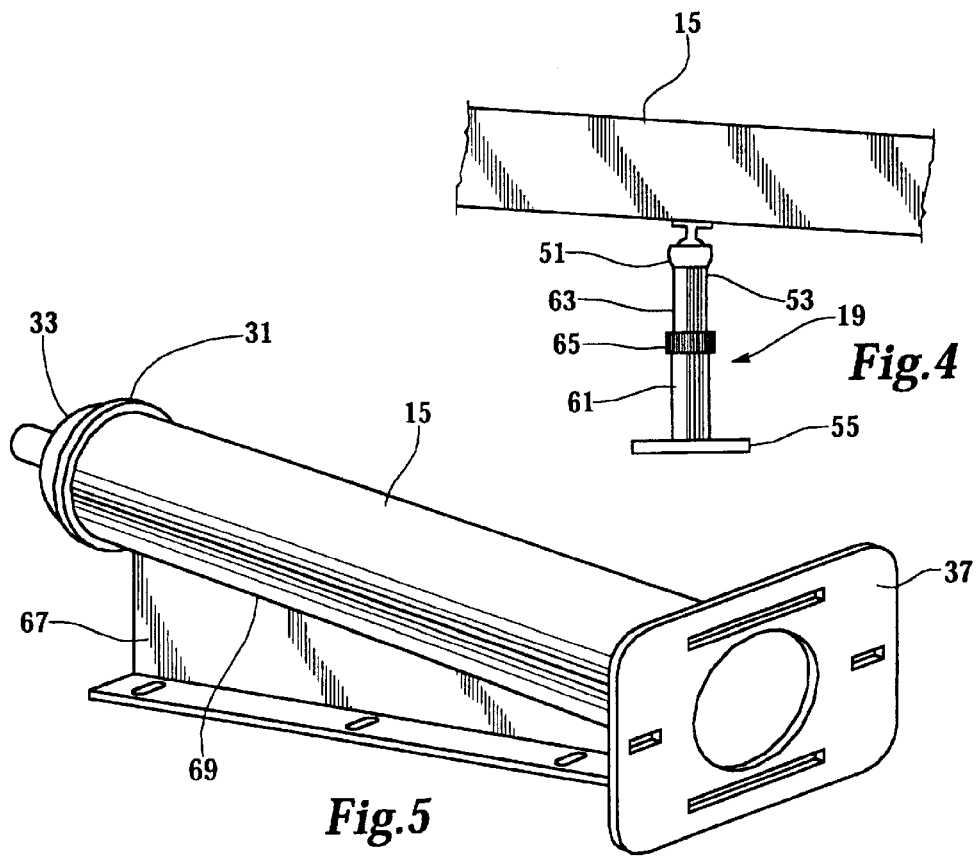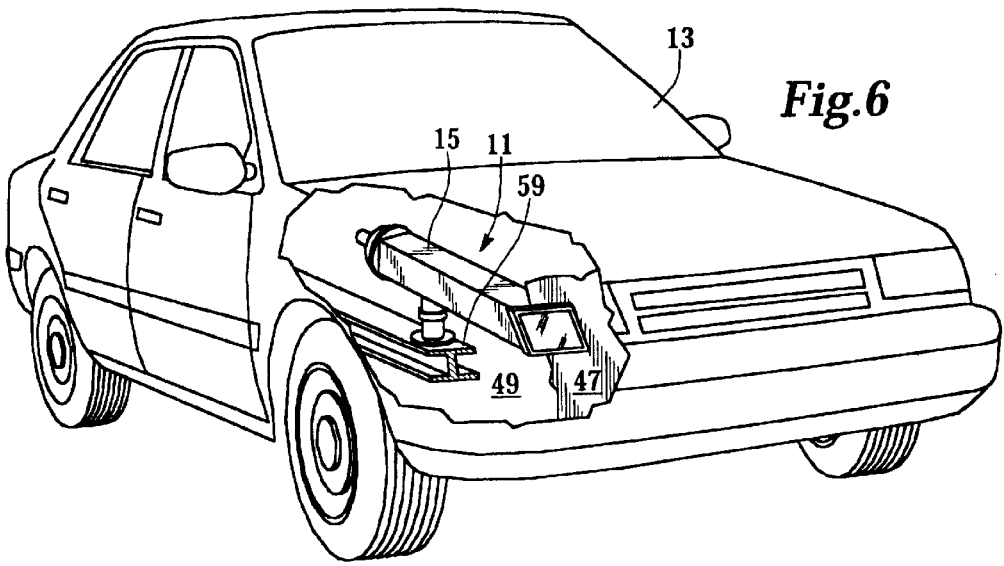

HEADLIGHT ANTIGLARE DEVICE

BACKGROUND OF THE INVENTION

1. Field of the Invention

This invention relates in general to vehicle headlight assemblies and accessories. In particular, the Kamps invention relates to a device for preventing glare from a vehicle headlight by preventing direct view of the headlight by the driver of an oncoming vehicle.

2. Description of the Related Art

The undesirable aspects of headlight glare have long been recognized. Even when the headlamps are properly mounted and aimed, direct light from the headlamp can be troublesome to oncoming drivers. This has become especially true with the advent of halogen lamps having greater intensity than prior headlamps, along with emission spectra that are generally more distracting than non-halogen lamps.

Numerous devices have been created to reduce headlight glare, but none of the devices adequately prevent the headlight from shining directly into the eyes of an oncoming driver. Several devices are disclosed in U.S. Pat. No. 1,949,769, issued to Walch, U.S. Pat. No. 2,719,216, issued to Brewer, and U.S. Pat. No. 2,784,303, issued to Heiser. While all these devices reduce glare to some extent, in every case they allow all or at least some of the headlamp to be directly viewed by the driver of an oncoming vehicle. Thus, the oncoming drivers will still experience glare from having the bright light of the headlamp shining directly and at full intensity into their eyes.

A need therefore remains for an antiglare device that completely shields a headlamp from direct view by an oncoming driver.

SUMMARY OF THE INVENTION

In general, the invention having the desired features includes an elongated duct, having a front opening and a rear opening, and mounting means for attaching the duct to a vehicle. The duct mounting means maintains the duct at a critical downward inclination from the rear opening to the front opening so that the duct completely shields the headlamp from direct view by an oncoming driver. The rear opening is designed to receive a headlamp that is positioned to shine through the duct and out the front opening.

In one embodiment, the device is installed as an aftermarket item, and means such as a frame attached to the front opening provides the means for attaching the front of the duct to the vehicle, while the duct mounting means supports the remainder of the duct and maintains it at the critical downward inclination. In another embodiment, the device is part of the original equipment of the car, so that an additional frame is not required for the duct front opening. Also, when the device is original equipment, the duct mounting means can be designed to provide the proper angle of inclination without the need for adjustment, as is required for an aftermarket device to be compatible with different vehicle models.

Additional features and advantages of the invention will become apparent in the following detailed description and in the drawings.

BRIEF DESCRIPTION OF THE DRAWINGS

FIG. 4 is a right side detail of the duct mounting means.

FIG. 5 is a perspective view of a second embodiment of the antiglare device, employing a duct with a circular cross section and different means for supporting the duct.

FIG. 6 is a perspective cut-away view of an alternative embodiment, having a shorter duct, for use with a compact headlamp.

DESCRIPTION OF THE PREFERRED EMBODIMENT

Figure 1:
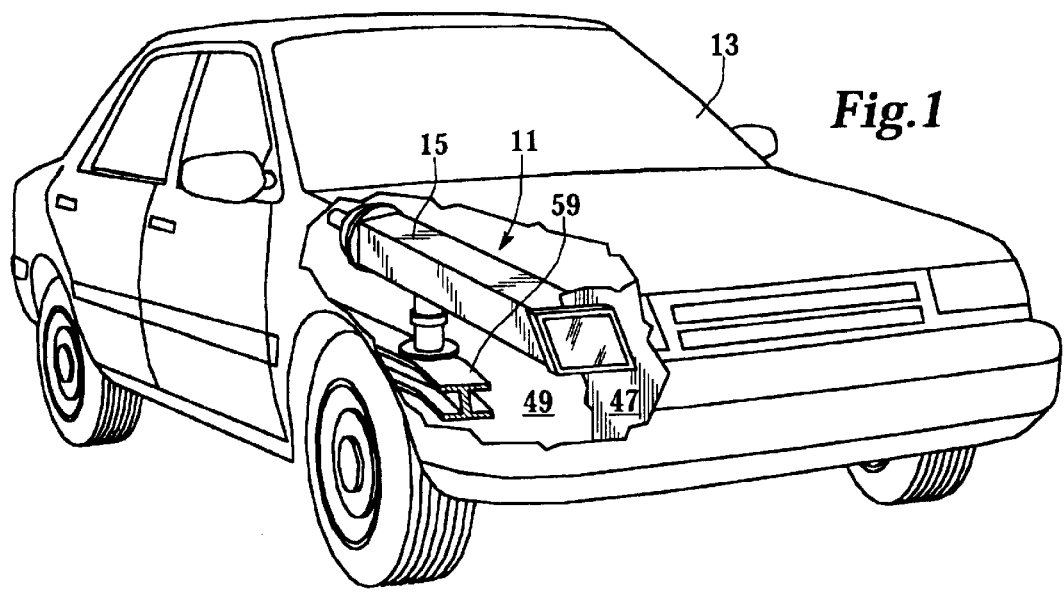
FIG. 1 is a perspective cut-away view of a headlight antiglare device in place in the engine compartment of a vehicle.

FIG. 1 shows an embodiment of the Kamps headlight antiglare device 11 of the invention that is installed preferably in pairs as an aftermarket accessory on an automobile 13. The invention can also be manufactured as part of the original equipment of the automobile, and can be employed in other land-based vehicle using headlights. Only one assembly of the preferred pair will be described, with the discussion applying equally to the other assembly. In the following discussion and in the claims, the terms headlight and headlamp are interchangeable, and refer to a conventional sealed beam assembly used to produce the main road illumination for night driving.

Figure 2:
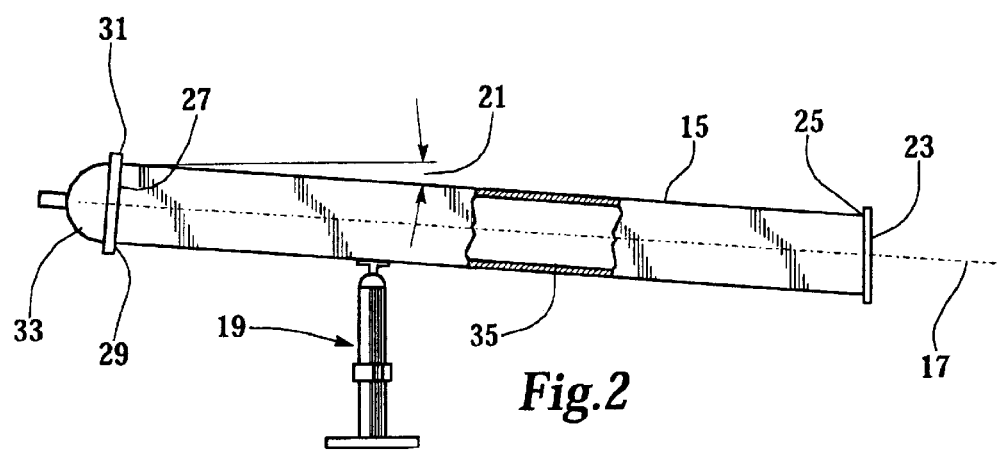
FIG. 2 is a right side elevational detail of the device outside the vehicle.

As shown in the detail of FIG. 2, the headlight antiglare device 11 includes an elongated duct 15 with a main axis 17, and duct mounting hardware 19 that provides the means for mounting the duct 15 in the vehicle 13 at an angle of inclination 21, which will be discussed later. The duct 15 has a front opening 23 having an upper edge 25, and a rear opening 27 having a lower edge 29. A headlamp mounting assembly 31 of conventional design is located at the rear opening 27 for mounting a headlamp 33. The headlamp mounting assembly preferably includes means (not shown) for aiming the headlamp 33 in compliance with local standards, such as SAE Standard J1383. The preferred headlamp 33 has a rectangular front cross section, and a height of about two inches (51 mm), but headlamps with different dimensions or circular cross section can also be used. The duct 15 has a substantially uniform cross section with roughly the same dimensions as that of the headlamp 33, or slightly larger. The inner surface 35 of the duct 15 is preferably made nonreflective, such as by covering it with a layer of black non-gloss paint, or by anodizing in the case of an aluminum duct.

The angle of inclination 21 of the duct 15 is critical to proper operation of the device. The angle is set so that the front opening's upper edge 25 is level with or below the rear opening's lower edge 29. Thus, the headlamp 33 cannot be directly seen through the duct 15 by an observer located above the level of the headlamp 33, such as an oncoming driver. Making the inner surface 35 of the duct 15 nonreflective reduces glare from a reflected image of the headlamp 33.

Figure 3:
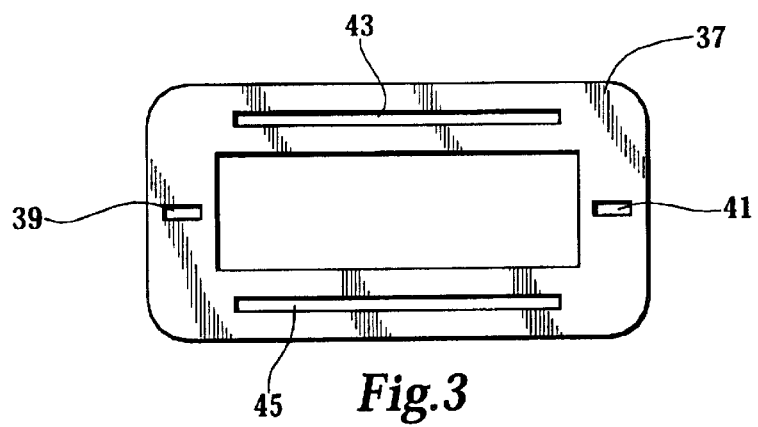
FIG. 3 is a front perspective view of one embodiment of a duct front mounting frame.

FIG. 3 depicts one way in which the front opening 23 can be attached to the vehicle 13. A front opening frame 37 attached to the front opening 23 provides the means for securing the front opening to the vehicle 13 for those embodiments where the device 11 is installed as an aftermarket accessory. Lateral slots 39 and 41 defined in the front opening frame 37 provide means for mounting the front opening frame 37 while allowing adjustment of the horizontal placement of the front opening frame 37. Top and bottom located receptor slots 43 and 45 defined in the front opening frame 37 are adapted to receive mating tabs (not shown) projecting from the front wall 47 (FIG. 1) of the vehicle engine compartment 49 in some vehicles. The front opening frame 37 is preferably covered with a coating or gasket made of a resilient material such as neoprene or rubber to provide a complete seal between the front opening frame 37 and the front wall 47 regardless of slight changes in the relative position of the duct for changes in the horizontal placement of the front opening frame 37, or of the angle of inclination 21 of the duct 15.

Turning to FIG. 4, the duct mounting hardware 19 includes a ball joint 51, a post 53, and a base 55 that is used to secure the post 53 to part of the vehicle frame 59 in the engine compartment 49 (FIG. 1). A ball joint 51 provides pivoting means to allow adjustment of the duct position vertically to obtain a specific angle of inclination 21, and horizontally, for adjusting the horizontal placement of the front opening frame 37, as already discussed. Other means known in the art can be used that permit the requisite movement, such as a pivot and swivel combination. The duct mounting hardware 19 is preferably located about two-thirds of the length of the duct 15 from the front opening 23.

The post 53 is preferably of tubular construction, having a lower tube 61 attached to the base 55 and a smaller, upper tube 63 engaging the lower tube 61 telescopically for adjustment of the overall post length. A threaded clamp 65 on the lower tube 61 is loosened to allow the upper tube 63 to slide up and down for adjustment of overall post length, whereupon the clamp 65 is tightened to lock the upper tube 63 in place. Other support means having adjustable length can also be used, such as rectangular arms interconnected with bolts and nuts, with adjustment slots on one or both arms.

The duct 15 is preferably about one foot (305 mm) long for every inch of height. Thus, for a two inch (51 mm) headlamp, the duct is two feet (609 mm) long. As much of the light from the headlight 33 as possible should exit the front opening 23 when the headlight 33 is properly aimed. Therefore, this ratio may require adjustment, especially for use with high beam headlights as compared to low beam headlights. This can require a duct length that can make access to the headlamp difficult. Since headlamps having less height will permit shorter ducts while still meeting the requirements for the angle of inclination 21, these types of headlamps are especially preferred, such as the aforementioned two inch rectangular model.

FIG. 5 depicts another embodiment for the antiglare device 11, intended for installation as original equipment, wherein equivalent structures are referenced with the same numbers as the first embodiment. In this embodiment, a circular headlamp 33 and duct 15 are used. Since the device is manufactured for use on a specific make and model of vehicle, the duct mounting hardware 19 need not provide adjustment for the angle of inclination 21. Instead, a triangular support beam 67 running along the entire bottom edge 69 of the duct 15 both provides support for the duct 15 and ensures the proper angle of inclination 21.

It can be seen that the duct mounting hardware 19 can take any number of forms within the scope of the invention, as long as the resulting structure provides the necessary support and maintains the duct 15 at the correct angle of inclination 21. Such forms include but are not limited to flanges, elbows, hangers, brackets and other structures known in the art. It should be apparent that the device 11 can also be attached to different points in the engine compartment of the vehicle, such as a wheel housing or firewall, rather than the frame itself. These configurations are considered to be equivalent to connecting the device to the frame.

The invention has several advantages over the prior art. The headlight antiglare device completely shields the headlamp from direct view by an oncoming driver, thereby substantially reducing glare. The headlight antiglare device can be constructed simply and inexpensively, and has no complicated moving parts. It is extremely rugged and durable.

The invention has been shown in several embodiments. It should be apparent to those skilled in the art that the invention is not limited to these embodiments, but is capable of being varied and modified without departing from the scope of the invention as set out in the attached claims.

What is claimed is:

1. A headlight antiglare device for use in a vehicle, the antiglare device comprising:

an elongated duct having a main axis, a rear opening and a front opening, the rear opening having a lower edge and the front opening having an upper edge, the rear opening being adapted for receiving a headlamp positioned so as to shine through the duct and out the front opening;

pivoting means attached to the duct, for allowing the duct to pivot in the two axes perpendicular to the duct main axis;

a post, also attached to the pivoting means, and capable of being adjusted in length to achieve the downward incline of the duct; and a base attached to the end of the post distal to the pivoting means, adapted for fixing the post to the vehicle;

the pivoting means, the post, and the base being used for mounting the duct to the vehicle at a downward angle of inclination from the rear opening to the front opening, so that the upper edge of the front opening is level with or lower than the lower edge of the rear opening, thereby preventing direct view of the headlamp by a driver in an oncoming vehicle.

2. A headlight antiglare device as recited in claim 1 further comprising front opening attachment means for attaching the duct front opening to the vehicle.

3. A headlight antiglare device as recited in claim 2, further comprising headlamp mounting means located at the duct rear opening for mounting a headlamp at the duct rear opening.

4. A headlight antiglare device as recited in claim 1, wherein the duct is rectangular, and sized to accommodate a headlamp having a height of roughly two inches.

5. In a motor vehicle, the combination of:

a frame;

an elongated duct having a rear opening and a front opening, the rear opening having a lower edge and the front opening having an upper edge, the rear opening being adapted to receive a headlamp positioned so as to shine through the duct and out the front opening;

a joint, attached to the duct and capable of independent movement in at least two perpendicular axes;

a post, also attached to the joint, and capable of telescoping; and a base interconnecting the post and the frame, so that the duct can be mounted to the frame at an angle of inclination, so that the upper edge of the front opening is level with or lower than the lower edge of the rear opening, thereby preventing direct view of the headlamp by a driver in an oncoming vehicle.

6. A motor vehicle as recited in claim 5, further comprising duct front opening attachment means for fixing the position of the duct front opening relative to the vehicle.

7. A motor vehicle as recited in claim 5, further comprising headlamp mounting means located at the duct rear opening for mounting a headlamp at the duct rear opening.

* * * * *